US008820515B2

(12) United States Patent
Houssian (10) Patent No.: US 8,820,515 B2
(45) Date of Patent: Sep. 2, 2014

(54) FEED AUGER LIFT ASSEMBLY FOR AN AGRICULTURAL CONVEYOR

(75) Inventor: Terry Douglas Houssian, Regina (CA)

(73) Assignee: Meridian Manufacturing Inc.

( * ) Notice: Subject to any disclaimer, the term of this patent is extended or adjusted under 35 U.S.C. 154(b) by 176 days.

(21) Appl. No.: 13/605,109

(22) Filed: Sep. 6, 2012

(65) Prior Publication Data

US 2013/0239536 A1    Sep. 19, 2013

Related U.S. Application Data

(60) Provisional application No. 61/531,464, filed on Sep. 6, 2011.

(51) Int. Cl.
  *B65G 21/10* (2006.01)
  *B65G 47/18* (2006.01)
  *B65G 33/32* (2006.01)
  *A01D 57/00* (2006.01)
  *B65G 41/00* (2006.01)
  *B60P 1/40* (2006.01)

(52) U.S. Cl.
  CPC .............. *A01D 57/00* (2013.01); *B65G 41/002* (2013.01); *B65G 33/32* (2013.01); *B60P 1/40* (2013.01)
  USPC ........... 198/666; 199/315; 199/301; 199/314; 199/317; 199/667

(58) Field of Classification Search
  None
  See application file for complete search history.

(56) References Cited

U.S. PATENT DOCUMENTS

| | | | |
|---|---|---|---|
| 4,603,775 A | 8/1986 | Plett | |
| 4,963,066 A | 10/1990 | Boppart | |
| 5,184,715 A | 2/1993 | Feterl | |
| 5,305,866 A | 4/1994 | Stewart et al. | |
| 5,788,055 A | 8/1998 | Stewart et al. | |
| 7,191,889 B1 | 3/2007 | Heley | |
| 7,428,956 B2 | 9/2008 | Scherman | |
| 8,381,900 B1 * | 2/2013 | Hoogestraat | 198/588 |
| 8,479,911 B2 * | 7/2013 | Friesen | 198/313 |
| 8,584,827 B1 * | 11/2013 | Jesse | 198/315 |
| 8,627,947 B2 * | 1/2014 | Houssian | 198/668 |

FOREIGN PATENT DOCUMENTS

EP    0684198    11/1995

* cited by examiner

*Primary Examiner* — Kavel Singh
(74) *Attorney, Agent, or Firm* — Ryan W. Dupuis; Kyle R. Satterthwaite; Ade & Company Inc.

(57) ABSTRACT

An agricultural conveyor assembly of the type including a main conveyor, a feed auger assembly, and a main auger boot pivotally supporting the outlet end of the feed auger assembly on the inlet end of the main conveyor for swinging movement further includes a feed auger lift assembly. The feed auger lift assembly includes: i) a support assembly pivotally supported on the main auger boot for pivotal movement with the feed auger assembly about an upright axis and which further pivotally supports the feed auger assembly thereon for relative pivoting about a horizontal lift axis; and ii) an extendable lift member coupled between the feed auger assembly and the support assembly such that the extendable lift member controls pivotal movement of the feed auger assembly about the lift axis while being movable together with the feed auger assembly about the swing axis.

11 Claims, 6 Drawing Sheets

FEED AUGER LIFT ASSEMBLY FOR AN AGRICULTURAL CONVEYOR

This application claims the benefit under 35 U.S.C. 119(e) of U.S. provisional application Ser. No. 61/531,464, filed Sep. 6, 2011.

FIELD OF THE INVENTION

The present invention relates to a lift assembly for lifting a feed auger tube relative to a main tube in an agricultural conveyor, and more particularly the present invention relates to a lift assembly comprising a hydraulic lift cylinder coupled between the feed auger tube and a support assembly which pivots with the feed auger tube about the swing axis of the feed auger tube relative to the main tube.

BACKGROUND

Various forms of agricultural conveyors are known for transferring grain or other particulate material from a source area to a target area, for example from a transport container to a bin or other storage type container. Transport containers generally involve a container supported for rolling movement along the ground by wheels spaced apart at opposing ends of the container. A hopper type discharge is then typically located between the wheels below the container for discharging into the auger which subsequently conveys the material to the storage container.

A common construction of an agricultural conveyor includes a main auger tube and a swinging feed auger which is pivotally coupled to the inlet end of the main auger tube. U.S. Pat. No. 5,184,715 to Feterl; U.S. Pat. Nos. 5,305,866 and 5,788,055 both to Stewart et al; U.S. Pat. No. 4,963,066 to Boppart; U.S. Pat. No. 4,603,775 to Plett; and U.S. Pat. No. 7,191,889 to Heley; and European Patent Application 0 684 198 disclose various examples of grain augers used for conveying particulate materials including a swing or feed auger. In each instance the main auger is supported on a wheeled frame for positioning of the discharge in alignment with the target area. The swing auger is provided at the inlet of the main auger for alignment with the source, for example the discharge hopper of a transport container.

Due to the swinging motion of the feed auger typically being driven by wheels on the inlet hopper of the feed auger which engage the ground, lifting of the feed auger is typically by a mechanism supported on the main auger tube above the feed auger in such a manner so as to prevent pivoting of the feed auger overtop of the main auger between two opposing lateral positions relative to the feed auger. Such movement of the feed auger would be desirable to allow collecting particulate material from two sources on opposing sides of the main auger while the conveyor remains connected to a towing vehicle such as a tractor.

U.S. Pat. No. 7,428,956 by Scherman discloses an improved feed auger assembly for a conveyor including first and second auger sections which are pivotal relative to one another allowing the loading hopper to be placed through an infinite number of positions about the inlet end of the main auger. A hydraulic cylinder drives pivotal movement of the second auger section relative to the main auger, but the hydraulic cylinder prevents pivoting of the auger sections across the main auger between two opposing sides of the main auger.

SUMMARY OF THE INVENTION

According to one aspect of the invention there is provided an agricultural conveyor assembly comprising:

a main conveyor comprising a main conveyor tube and a main conveying member in the main conveyor tube which is arranged to convey particulate material from an inlet end to an outlet end of the main conveyor tube;

a frame supporting the main conveyor tube at an upward incline from the inlet end to the outlet end in a working position of the main conveyor;

a main auger boot coupled to the inlet end of the main conveyor tube;

a support assembly pivotally supported on the main auger boot for pivotal movement relative to the main conveyor tube about a generally upright swing axis;

a loading hopper having a loading opening arranged to load the particulate material therein;

a feed auger assembly extending in a longitudinal direction from an inlet end in communication with the loading hopper so as to be arranged to receive the loaded particulate material from the loading hopper to an outlet end coupled to the support assembly so as to be arranged for communication with the inlet end of the main conveyor for discharging the loaded particulate material into the inlet end of the main conveyor;

the support assembly pivotally supporting the outlet end of the feed auger assembly thereon such that the feed auger assembly is pivotal relative to the feed auger support assembly and the main conveyor tube about a generally horizontal lift axis; and an extendable lift member extending between a first end pivotally coupled to the feed auger assembly and a second end pivotally coupled to the support assembly such that the extendable lift member controls pivotal movement of the feed auger assembly about the lift axis while being movable together with the feed auger assembly about the swing axis.

By connecting lift member to a support member which pivots with the feed auger assembly about the swing axis, the lift member does not restrict pivotal movement of the feed auger assembly and permits the feed auger assembly to be readily displaced overtop of the main auger between two laterally opposed loading positions if desired.

Preferably the lift member is coupled to the support assembly spaced above the outlet end of the feed auger assembly and adjacent to the swing axis.

When there is provided an inlet opening in the main auger boot which is arranged to receive particulate material therethrough from the feed auger assembly, preferably the support assembly comprises a pivot ring portion rotatably supported on the main auger boot about the inlet opening and an upright portion rigidly connected to the pivot ring portion and extending upwardly from the pivot ring portion such that the lift member is pivotally coupled to the upright portion.

The upright portion may comprise a pair of support arms mounted at diametrically opposed sides of the pivot ring portion.

Preferably both the outlet end of the feed auger assembly and the second end of the lift member are pivotally coupled to the upright portion at spaced apart positions in a direction of the swing axis.

The pivot ring portion may comprise a collar rotatably supported in the inlet opening in a top wall of the main auger boot and a peripheral flange extending radially outward from the collar upon which the upright portion is supported.

The conveyor assembly may further comprise an annular driven member coupled to the pivot ring portion for rotation therewith about the swing axis, and a swing drive motor operatively coupled to the annular driven member so as to be arranged to rotate the annular driven member and the feed auger assembly therewith about the swing axis.

When the main auger boot may comprise a top wall rotatably supporting the pivot ring portion thereon and a support wall parallel and spaced above the top wall, preferably the upright portion is coupled to the pivot ring portion above support wall and the annular driven member is supported between the top wall and the support wall thereabove.

When the swing drive motor is supported on the main conveyor spaced radially outward from the annular driven member in relation to the swing axis, the annular driven member may comprise a circumferential gear operatively connected to swing drive motor by a drive chain.

The lift member is preferably arranged for pivotal movement about the swing axis together with the feed auger assembly through an intermediate position overtop of the main conveyor between a first offset position in which the feed auger assembly extends outwardly from one side of the main conveyor in a first lateral direction and a second offset position in which the feed auger assembly extend outwardly from the other side of the main conveyor in a second lateral direction opposite to the first lateral direction. The feed auger assembly in this instance extends from the discharge end at the inlet end of the main conveyor to the loading hopper towards the outlet end of the main conveyor in the intermediate position.

One embodiment of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Figure 1:
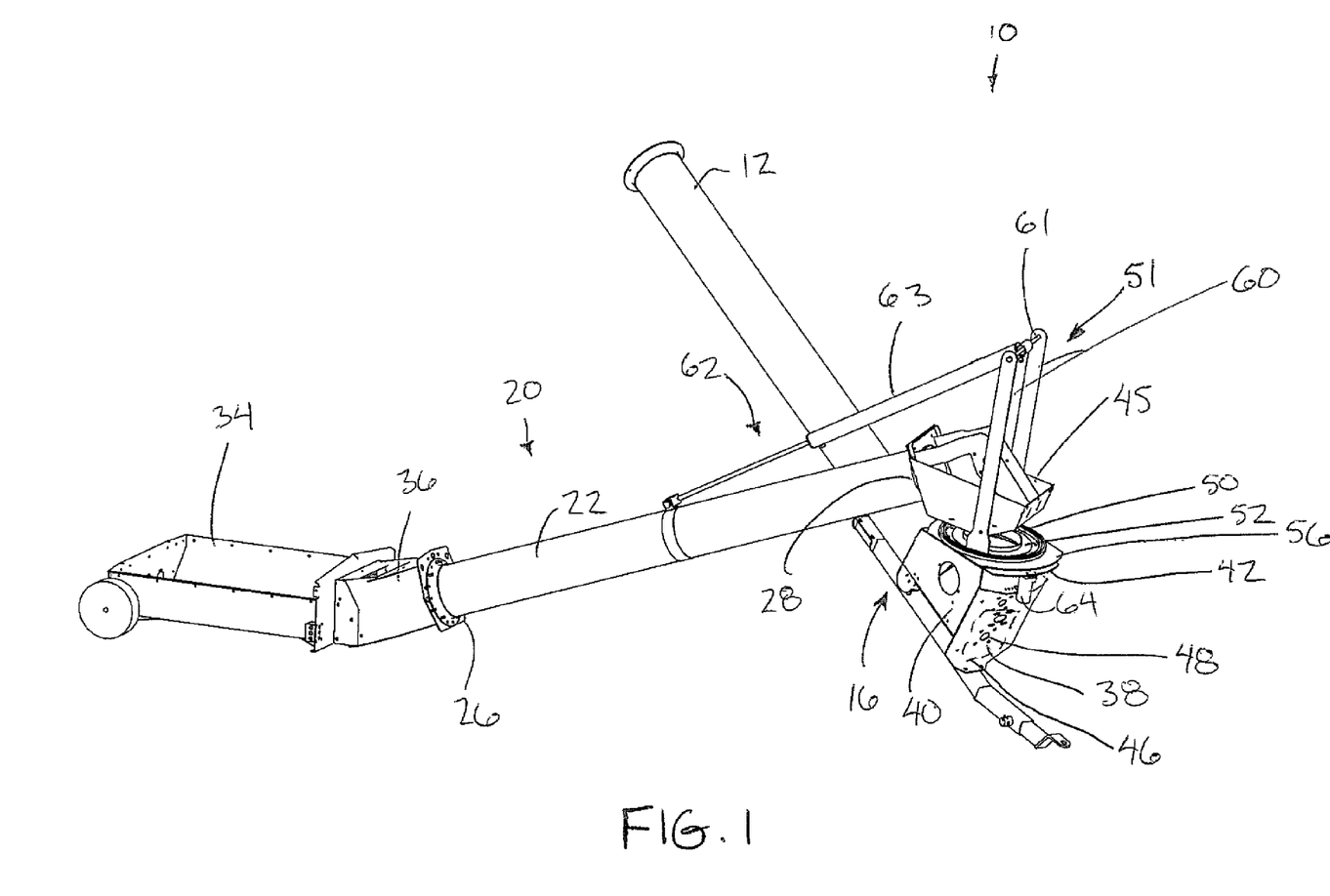
FIG. 1 is a perspective view of the feed auger lift assembly on a first embodiment of the conveyor assembly shown in a lowered position of the hopper corresponding to an extended position of the lift member.
Figure 2:
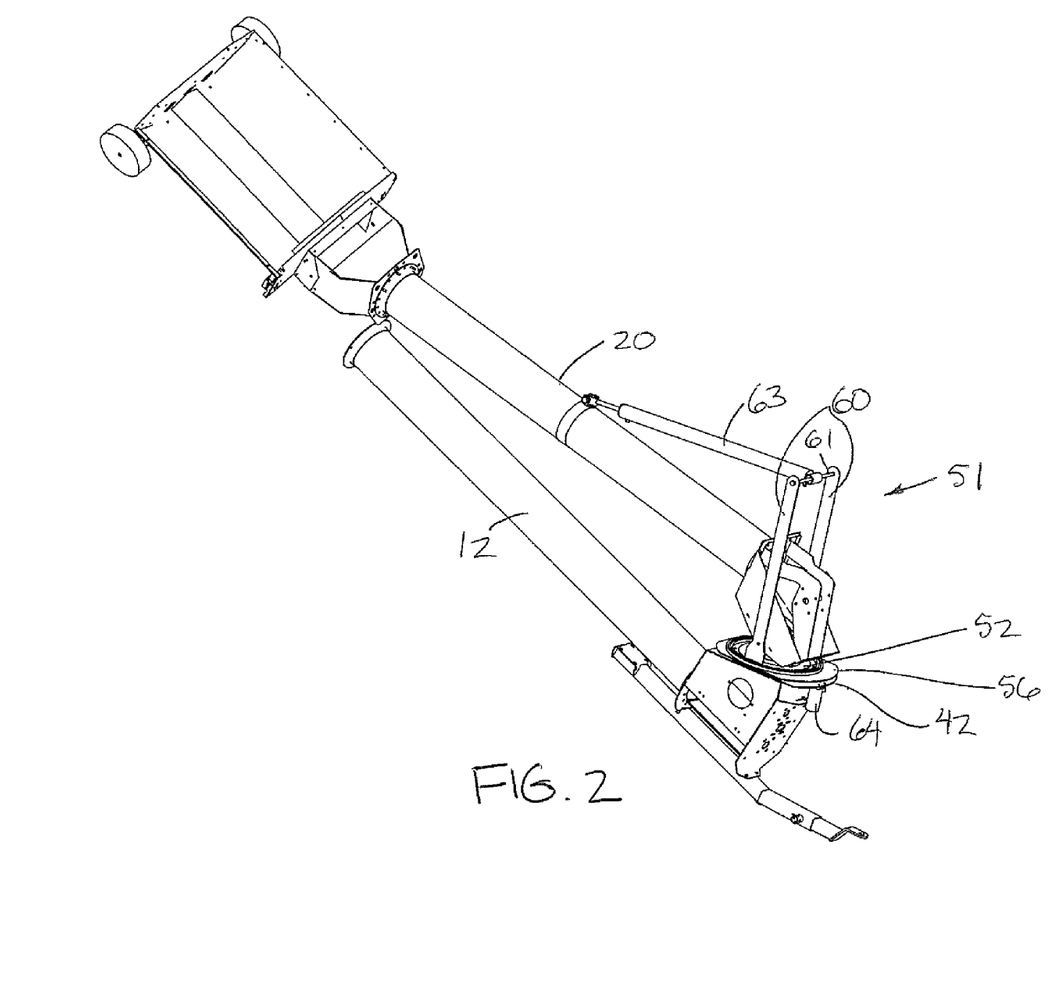
FIG. 2 is a perspective view of the feed auger lift assembly on the conveyor assembly of FIG. 1 shown in a raised position of the hopper corresponding to a retracted position of the lift member.
Figure 3:
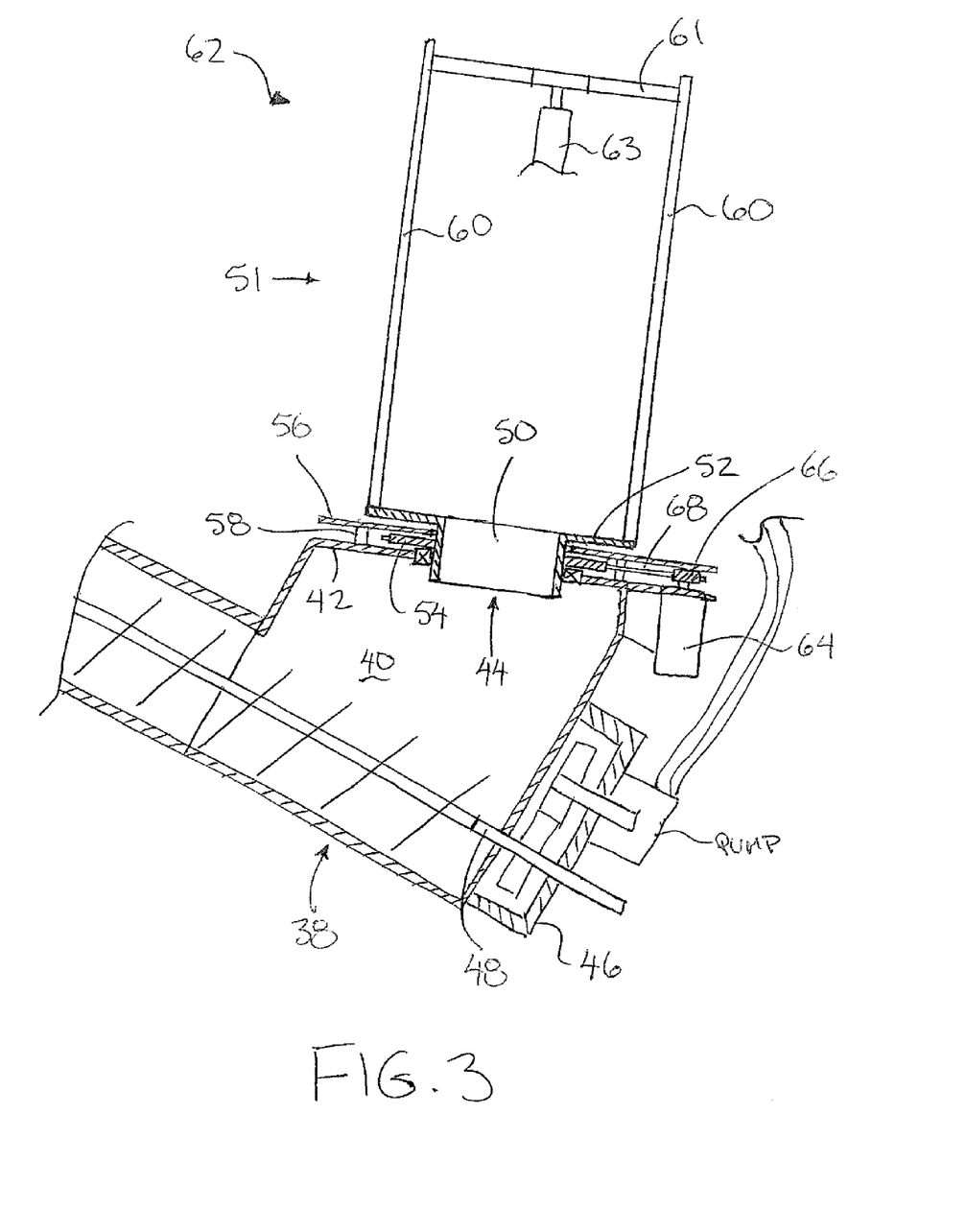
FIG. 3 is a vertical cross section through the main auger boot at the swing axis.
Figure 4:
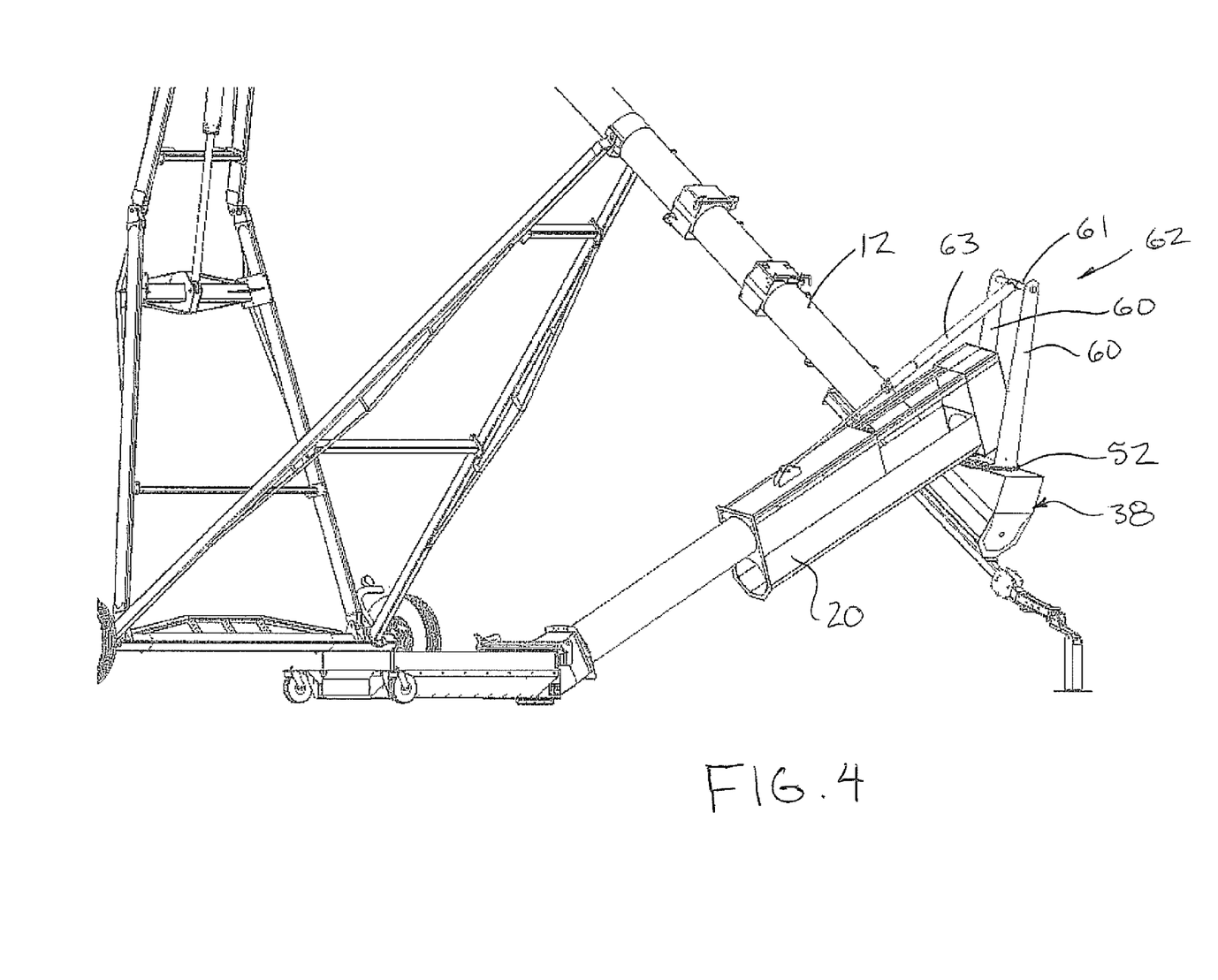
FIG. 4 is a perspective view of the feed auger lift assembly on a second embodiment of the conveyor assembly shown in the lowered position of the hopper.
Figure 5:
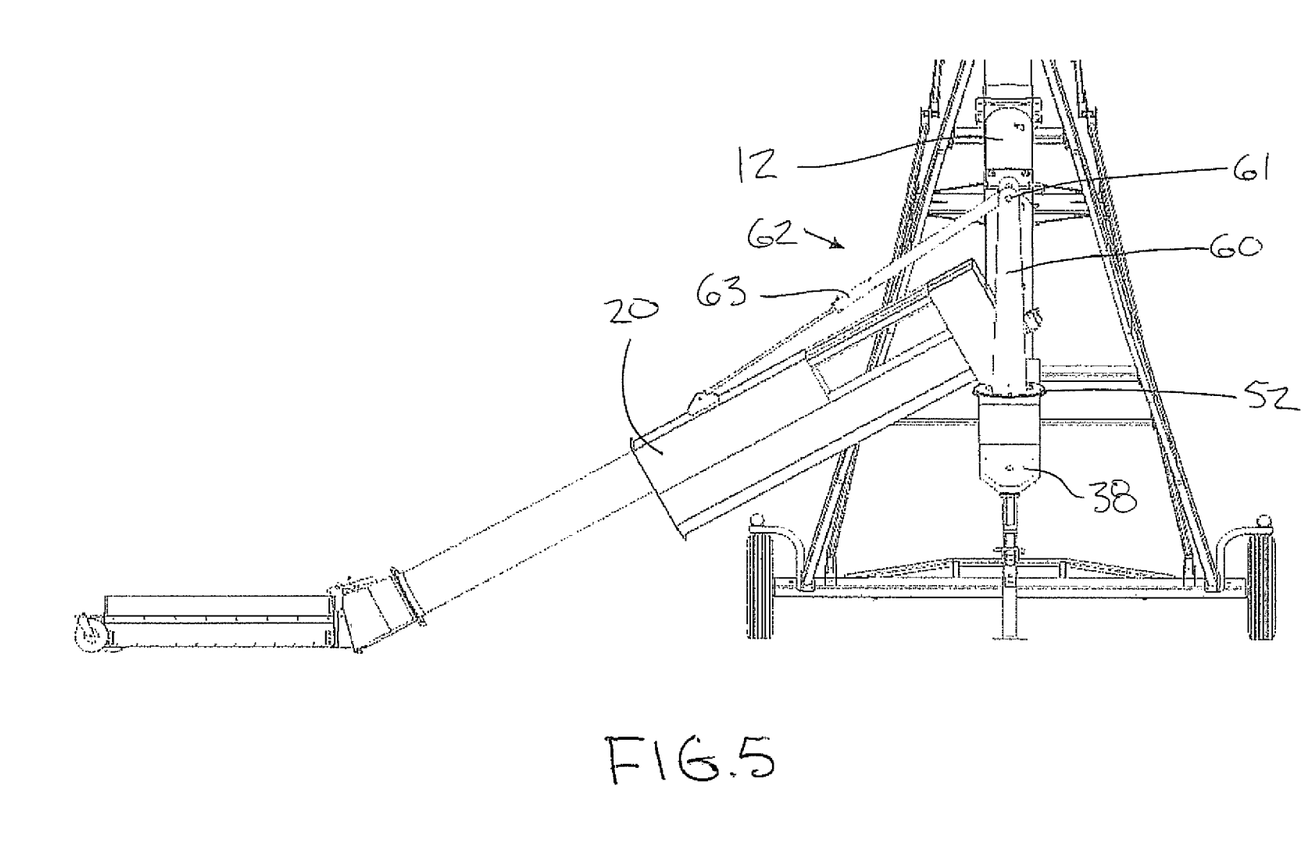
FIG. 5 is an end elevational view of the feed auger lift assembly on the conveyor assembly of FIG. 4 shown in the lowered position of the hopper.
Figure 6:
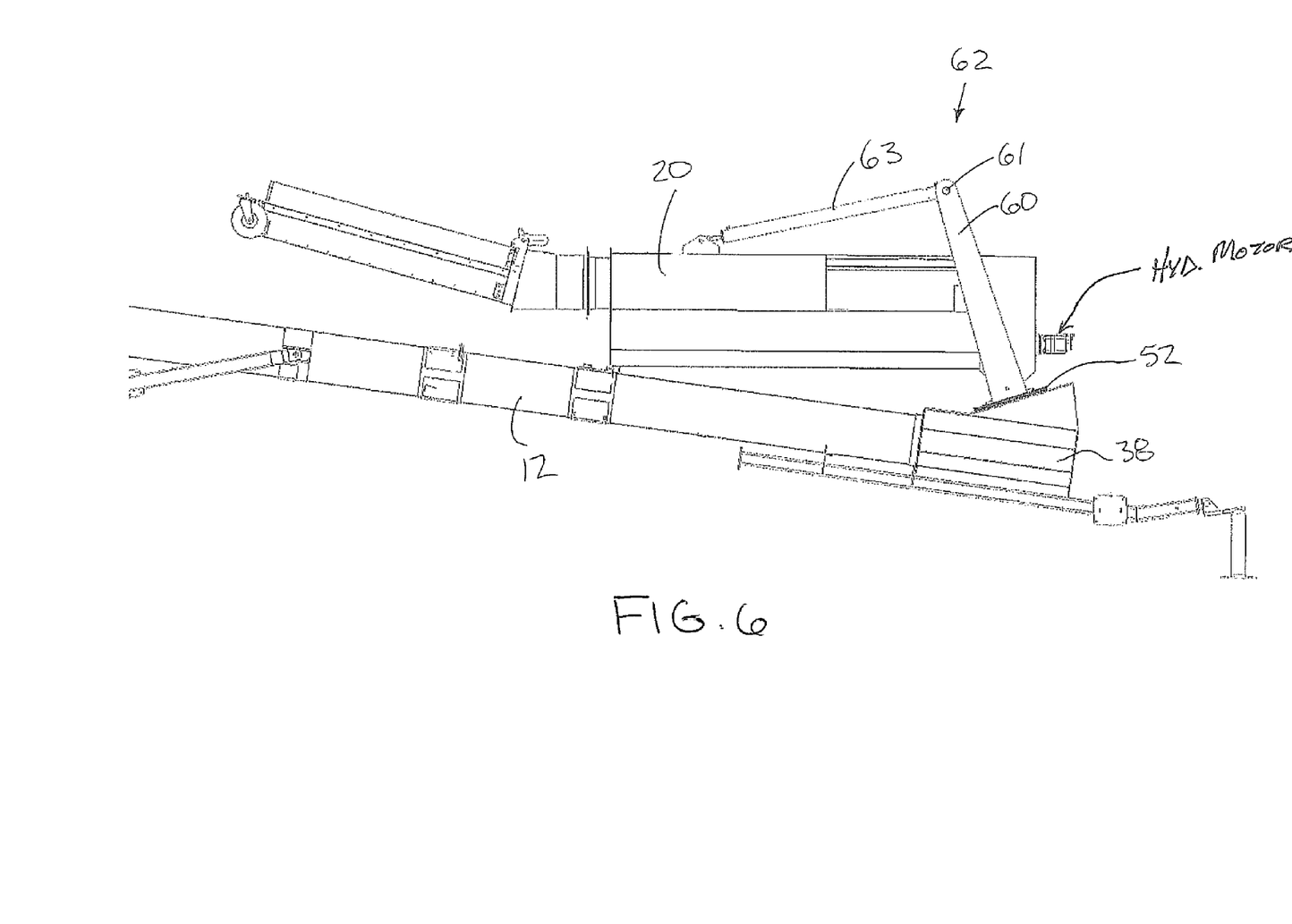
FIG. 6 is a side elevational view of the feed auger lift assembly on the conveyor assembly of FIG. 4 shown in the raised position of the hopper in a transport position of the main conveyor.

Referring to the accompanying figures there is illustrated a conveyor assembly generally indicated by reference numeral 10. The assembly 10 is suited for use as an agricultural auger for conveying particulate material, for example grain, seed or other similarly particulate materials.

The assembly 10 includes a main conveyor 12 comprised of a main conveyor tube 14 which is elongate in a respective longitudinal direction between an inlet end 16 and an outlet end (not shown). A main conveying member within the main conveyor tube 14 comprises an auger (not shown) in the illustrated embodiment which is rotatable about a longitudinal axis thereof to convey the particulate material from the inlet end to the outlet end.

The main conveyor also comprises a frame which supports the main conveyor tube 14 on wheels for rolling movement generally in the longitudinal direction of the conveyor. The frame comprises an adjustable linkage which supports the main conveyor through a range of movement between a working position extending at an upward incline from the inlet end adjacent the ground to the outlet end spaced upwardly and rearwardly therefrom and a transport position in which the main conveyor tube is nearer to horizontal than the working position. The main conveyor is generally shown in the working position in the accompanying figures.

The main conveyor further comprises a hitch connection 18 coupled to the main conveyor tube adjacent the inlet end thereof such that the hitch connection extends forwardly beyond the inlet end. The hitch connection permits the connection of the inlet end of the main conveyor tube to a towing vehicle such that the vehicle can be towed in the normal forward working direction of the vehicle with the main conveyor tube extending rearwardly from the inlet end to the outlet end trailing rearwardly therefrom.

The conveyor assembly 10 further comprises a feed auger assembly 20 coupled to the inlet end of the main conveyor tube to assist in loading particulate material into the main conveyor. According to a first embodiment, the feed auger assembly generally comprises a feed auger tube 22 rotatably receiving a feed auger 24 for rotation about a respective longitudinal axis so as to convey material from an inlet end 26 thereof to a respective outlet end 28 to discharge particulate material from the hopper into the inlet end of the main conveyor. Alternatively, according to a second embodiment, the feed auger tube 22 may comprise first and second tube sections arranged to be extended in a longitudinal direction relative to one another in which the feed auger 24 similarly comprises first and second sections received in the first and second feed auger tube sections respectively. In either instance, the feed auger assembly is pivotal about a first upright swing axis at the inlet end of the main conveyor tube and about a second horizontal lift axis also adjacent the inlet end of the main conveyor tube.

A loading hopper 34 is provided for loading the particulate material into the inlet end of the feed auger tube 22 of the feed auger assembly. The hopper 34 is fixed to the inlet end of the feed auger assembly for movement therewith about the upright swing axis and the lift axis. The hopper is similar to many conventional swing auger hoppers so as to be both wider and longer than it is in height and so as to be relatively low in profile for being received under the discharge of various implements such as the discharge chute under particulate material carrying trailers for example. The hopper includes an open top end spanning substantially the full width and length of the hopper into which particulate material is arranged to be received. A suitable conveying mechanism at the bottom end of the hopper conveys the loaded particulate material through a discharge 36 connected to the inlet end of the feed auger assembly to which it is coupled. The material is then conveyed in the longitudinal direction of the feed auger assembly from the inlet end to the outlet end prior to being loaded into the main conveyor tube.

The main conveyor tube is provided with an inlet housing 38 in the form of a main auger boot at the inlet end thereof for supporting the feed auger assembly 28 pivotally thereon. The inlet housing or main auger boot 38 substantially surrounds the inlet end of the main conveyor tube and comprises two side walls 40 extending upwardly above the tube at opposing sides thereof to define a receiving chamber above the tube in open communication with the conveying member rotatable within the tube 14. A top wall 42 of the inlet housing is connected between the two side walls spaced above the tube for locating an inlet opening 44 therein adjacent the inner end of the inlet housing so as to be spaced rearwardly from the front end of the housing and conveyor tube.

The feed auger assembly also includes a feed auger boot 45 mounted at the outlet end of the feed auger tube which serves to couple the outlet end of the feed auger tube to main auger boot 38. The feed auger boot 45 comprises an enclosed housing which redirects material discharged from the feed auger tube downwardly through a bottom discharge opening in alignment directly above the inlet opening of the main auger boot throughout the relative pivotal movement of the feed auger assembly relative to the main conveyor. A main shaft of the feed auger protrudes through the outer end of the feed auger boot for receiving a drive input to drive the rotation of the feed auger.

A main drive 46 is mounted at the inlet end of the conveyor tube and inlet housing for receiving a drive input, for example connection to a power take off shaft of a tractor or a hydraulic output of a tractor. The main drive 46 includes a first output shaft 48 concentric with the main conveyor tube for direct connection to the main conveying member rotatable therein for driving the main conveyor screw.

A second output shaft of the main drive 46 can be used to drive a hydraulic pump (not shown) which is in turn connected to a hydraulic motor (not shown) connected to the main shaft of the feed auger at the outlet end of the feed auger assembly so as to drive rotation of the feed auger relative to the feed tube.

The feed auger assembly is supported on the inlet housing by a support assembly which includes a pivot ring portion or collar 50 extending through the inlet opening in the top wall of the main auger boot and an upright portion 51 rigidly connected to the pivot ring portion in fixed relation therewith for rotation together about the swing axis with the feed auger assembly. Suitable bearings rotatably support the collar 50 relative to the top wall of the main auger boot. A peripheral flange 52 protrudes radially outward from the top edge of the collar 50 at a location spaced above the top wall of the main auger boot.

The collar 50 functions as an annular driven member supported about the inlet opening on the top wall so as to be concentric with the swing axis for rotation with the feed auger assembly relative to the top wall of the inlet housing on the conveyor tube by being provided with a circumferential gear 54 fixed about the collar. The circumferential gear 54 is coupled about the collar between the flange 52 and the top wall so as to be located directly above the top wall externally of the main enclosure of the main auger boot.

A support wall 56 in the form of a rigid plate is mounted parallel to and spaced above the top wall of the main auger boot by suitable spacer mounts 58 at circumferentially spaced positions about the inlet opening. A corresponding opening in the support wall receives the collar 50 extending upwardly therethrough such that the flange 52 overlaps a top side of the support wall. The circumferential gear 54 is located between the support wall 56 and the top wall.

The flange 52 at the top of the collar forming the pivot ring or annular driven member supports the upright portion 51 of the support assembly thereon. The upright portion generally comprises two arms 60 extending upwardly in the direction of the swing axis to define a pair of pivot mounts at diametrically opposed sides of the inlet opening. The two mounts or support arms 60 extend upwardly for pivotally coupling to the feed auger boot 45 (or discharge housing of the feed auger) for relative pivotal movement about the horizontal lift axis extending between the two pivot mounts.

The two arms 60 are mounted on the flange 52 at a location spaced radially outward from the collar 50 in the inlet opening so as to be spaced apart in a horizontal lateral direction by a distance which is greater than the width of the feed auger boot in the lateral direction perpendicular to the longitudinal direction of the feed auger assembly. The feed auger assembly is thus arranged to be pivoted about a generally horizontal first common axis of the two pivot mounts or arms 60 as the height of the loading hopper is adjusted by operation of a feed auger lift assembly 62 as described in further detail below. The first common axis defines the lift axis of the feed auger assembly and is located adjacent to the bottom ends of the arms.

The two arms have a height in the direction of the swing axis which is greater than the feed auger boot such that a mounting rod 59 can be mounted between the top ends of the arms 60. The mounting rod 59 defines a generally horizontal second axis which is parallel to the lift axis of the feed auger assembly and is spaced thereabove in the direction of the swing axis.

The feed auger lift assembly 62 comprises an extendable lift member 63 in the form of a hydraulically actuated piston cylinder assembly. The lift member 63 is pivotally coupled to the mounting rod 61 at a cylinder end or second end thereof for relative pivotal movement about the axis of the mounting rod. The lift member 63 is also pivotally coupled to the feed auger tube 22 at the piston end or first end thereof for relative pivotal movement about a respective axis which is parallel to the mounting rod 61. The lift member is pivotally coupled to the feed auger tube 22 at an intermediate location so as to be near a centre of the feed tube in the longitudinal when the feed auger tube comprises a single fixed tube. Alternatively, when the feed auger tube comprises first and second sections which are extendable relative to one another, the lift member is pivotally coupled to the second section at the outlet end at a location nearest to the inlet end so as to be near a centre in the longitudinal direction when the first and second sections are at their greatest longitudinal extension relative to one another.

The rotation of the feed auger assembly about the swing axis is driven by a swing drive motor 64 comprising a hydraulic orbit motor mounted on the top wall of the inlet housing at a location spaced forwardly of the inlet opening. The motor 64 is thus spaced radially outward from the circumferential gear 54 defining the annular driven member about the inlet opening in relation to the swing axis. The motor 64 is typically mounted externally at the top side of the main auger boot with an output shaft extending through the top wall for connection to a drive sprocket 66 mounted internally within the inlet housing. A suitable drive chain 68 extends about the drive sprocket 66 and the circumferential gear 54 of the annular driven member so that the output of the swing drive motor controls the rotation of the annular driven member about the swing axis which in turn controls the swinging of the feed auger assembly connected thereto for pivotal movement about the swing axis relative to the main conveyor tube. The drive sprocket 66 and the chain 68 are also received in the space between the top wall of the auger boot and the support wall above it so as to be external from the main enclosure of the main auger boot while remaining protected and relatively enclosed by the top wall and support wall.

The feed auger assembly is pivotal through a range typically corresponding to approximately 300° from a first offset position to an opposing second offset position. In the first offset position, the feed auger assembly extends outwardly from one side of the main conveyor in a first lateral direction inclined forwardly. From the first offset position the feed auger assembly is pivotal rearwardly towards the outlet end of the main conveyor tube to an intermediate position supported by the feed auger lift assembly 62 overtop of the main conveyor in which the feed auger assembly is along the top side of main conveyor such that a longitudinal axis of the feed auger assembly and a longitudinal axis of the main auger lie in a substantially common vertical plane.

The feed auger assembly can continue to swing overtop of the main conveyor tube to the opposing side to the second offset position in which the feed auger assembly extends outwardly from the other side of the main conveyor in a second lateral direction opposite to the first lateral direction. The feed auger assembly is also inclined forwardly in the second offset position. In this manner the feed auger assembly can be pivoted between the first and second offset positions overtop of the main conveyor tube while the main conveyor tube remains connected at the hitch connection to the towing vehicle. This is particularly advantageous when it is desirable to unload particulate material from two different sources into the feed auger assembly when the two sources are on opposing sides of the main conveyor tube and the towing vehicle remains connected to the hitch connection of the main conveyor.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural conveyor assembly comprising:
   a main conveyor comprising a main conveyor tube and a main conveying member in the main conveyor tube which is arranged to convey particulate material from an inlet end to an outlet end of the main conveyor tube;
   a frame supporting the main conveyor tube at an upward incline from the inlet end to the outlet end in a working position of the main conveyor;
   a main auger boot coupled to the inlet end of the main conveyor tube;
   a support assembly pivotally supported on the main auger boot for pivotal movement relative to the main conveyor tube about a generally upright swing axis;
   a loading hopper having a loading opening arranged to load the particulate material therein;
   a feed auger assembly extending in a longitudinal direction from an inlet end in communication with the loading hopper so as to be arranged to receive the loaded particulate material from the loading hopper to an outlet end coupled to the support assembly so as to be arranged for communication with the inlet end of the main conveyor for discharging the loaded particulate material into the inlet end of the main conveyor;
   the support assembly pivotally supporting the outlet end of the feed auger assembly thereon such that the feed auger assembly is pivotal relative to the feed auger support assembly and the main conveyor tube about a generally horizontal lift axis; and
   an extendable lift member extending between a first end pivotally coupled to the feed auger assembly and a second end pivotally coupled to the support assembly such that the extendable lift member controls pivotal movement of the feed auger assembly about the lift axis while being movable together with the feed auger assembly about the swing axis.

2. The conveyor assembly according to claim 1 wherein the lift member is coupled to the support assembly spaced above the outlet end of the feed auger assembly.

3. The conveyor assembly according to claim 2 wherein the lift member is coupled to the support assembly adjacent to the swing axis.

4. The conveyor assembly according to claim 1 wherein there is provided an inlet opening in the main auger boot which is arranged to receive particulate material therethrough from the feed auger assembly and wherein the support assembly comprises a pivot ring portion rotatably supported on the main auger boot about the inlet opening and an upright portion rigidly connected to the pivot ring portion and extending upwardly from the pivot ring portion, the lift member being pivotally coupled to the upright portion.

5. The conveyor assembly according to claim 4 wherein the upright portion comprises a pair of support arms mounted at diametrically opposed sides of the pivot ring portion.

6. The conveyor assembly according to claim 4 wherein both the outlet end of the feed auger assembly and the second end of the lift member are pivotally coupled to the upright portion at spaced apart positions in a direction of the swing axis.

7. The conveyor assembly according to claim 4 wherein the pivot ring portion comprises a collar rotatably supported in the inlet opening in a top wall of the main auger boot and a peripheral flange extending radially outward from the collar upon which the upright portion is supported.

8. The conveyor assembly according to claim 4 further comprising:
   an annular driven member coupled to the pivot ring portion for rotation therewith about the swing axis; and
   a swing drive motor operatively coupled to the annular driven member so as to be arranged to rotate the annular driven member and the feed auger assembly therewith about the swing axis.

9. The conveyor assembly according to claim 8 wherein the main auger boot comprises a top wall rotatably support the pivot ring portion thereon and a support wall spaced above the top wall and wherein the upright portion is coupled to the pivot ring portion above support wall and the annular driven member is supported between the top wall and the support wall thereabove.

10. The conveyor assembly according to claim 9 wherein the swing drive motor is supported on the main conveyor spaced radially outward from the annular driven member in relation to the swing axis, and the annular driven member comprises a circumferential gear operatively connected to swing drive motor by a drive chain.

11. The conveyor assembly according to claim 1 wherein the lift member is arranged for pivotal movement about the swing axis together with the feed auger assembly through an intermediate position overtop of the main conveyor between a first offset position in which the feed auger assembly extends outwardly from one side of the main conveyor in a first lateral direction and a second offset position in which the feed auger assembly extend outwardly from the other side of the main conveyor in a second lateral direction opposite to the first lateral direction, the feed auger assembly extending from the discharge end at the inlet end of the main conveyor to the loading hopper towards the outlet end of the main conveyor in the intermediate position.

* * * * *